(No Model.)
R. E. TOLLNER & C. N. POTTER.
PNEUMATIC TIRE.
No. 517,312. Patented Mar. 27, 1894.
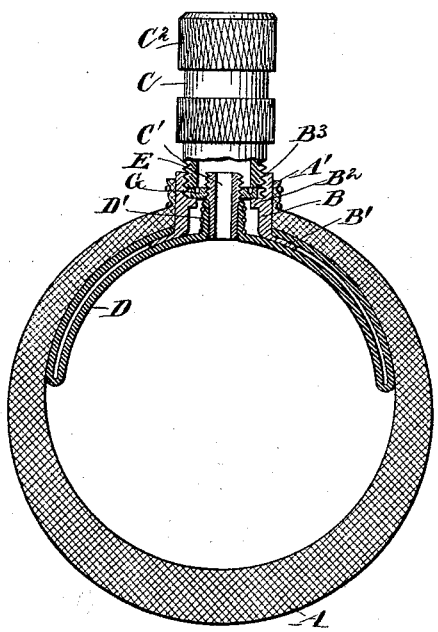
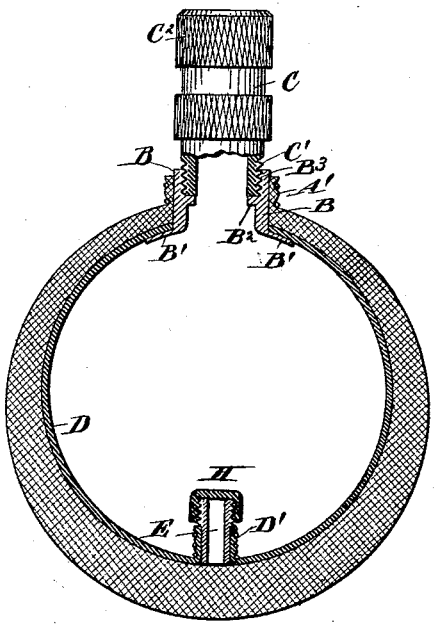
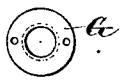
Witnesses:
Charles R. Searle.
M. F. Boyle.
Inventors:
Rudolph E. Tollner
and Charles N. Potter
by their attorney
Thomas Drew Stetson
THE NATIONAL LITHOGRAPHING COMPANY,
WASHINGTON, D. C.

UNITED STATES PATENT OFFICE.

RUDOLPH EUGENE TOLLNER AND CHARLES NEWTON POTTER, OF BROOKLYN, NEW YORK.

PNEUMATIC TIRE.

SPECIFICATION forming part of Letters Patent No. 517,312, dated March 27, 1894.

Application filed July 22, 1893. Serial No. 481,224. (No model.)

*To all whom it may concern:*

Be it known that we, RUDOLPH EUGENE TOLLNER and CHARLES NEWTON POTTER, citizens of the United States, residing in the city of Brooklyn, in the county of Kings and State of New York, have invented a certain new and useful Improvement in Pneumatic Tires for Bicycles and Analogous Wheels; and we do hereby declare that the following is a full and exact description thereof.

The invention applies to that class of pneumatic tires in which there are two independent thicknesses, an inner tire of fine rubber which can be collapsed, and which is so held so long as the outer tire remains air-tight. When by any accident the outer tube is punctured and can no longer fulfill the function of containing compressed air, it still remains in place as a strong and yielding mechanical defense, and the inner tire is inflated and tightly retains the fresh charge of air.

Our invention provides a nozzle for the internal tire which is so much smaller than the interior of the main nozzle that it can be held therein, and we provide means for holding it in such position during the period while the internal tire is out of use. When the external tire fails, the bicyclist by a simple series of movements changes the conditions, and on again pumping the compound tire full the inner tire receives the charge and is distended to fill the entire interior of the other.

The accompanying drawings form a part of this specification and represent what we consider the best means of carrying out the invention.

Figure 1 is a transverse section of the tire at the nozzle, showing the internal tire idle. Fig. 2 is a corresponding section showing the internal tire distended for use. Fig. 3 is a side view of the cap which is matched air-tight on the internal nozzle when the second condition obtains. Fig. 4 is a face view of the thin nut alone.

Similar letters of reference indicate corresponding parts in all the figures where they appear.

A is the stout external tire and A' a neck or rim by which it is tightly wired upon a nozzle B in the interior. This nozzle is of brass, and has a flared outer flange B' at its inner end and a sufficient internal offset $B^2$ at its mid-length. The interior of the mouth is screw-threaded, as at $B^3$.

C is a short tube, screw-threaded exteriorly as indicated by C', having a close-fitting cap $C^2$ at its upper end engaged by screw-threads. This tube incloses an ordinary self-acting valve, not shown.

D is the internal tire. It is a tube in the form of a ring like the exterior tire, but much thinner. It should be of good material and capable of being collapsed into a small space. Its liberal aperture incloses the nozzle B, and the edges are strongly held by the flanges B'. At the right point in the interior of this tire D is an internal neck D' which is wired upon a metallic nozzle E. The outer surface of this latter is screw-threaded and is adapted to receive alternatively the thin nut G, shown in Fig. 1, or the close-fitting cap H, shown in Fig. 2. The outer face of the nut G is equipped to be operated by a forked turning key, not shown.

In fitting up a wheel with our invention, all the parts being new and perfect, the internal nozzle E receives the thin nut G, and the tube C is screwed down firmly upon the latter so that all the parts are held in the position shown in Fig. 1. The wheel may be used for any period thus equipped.

To make the inner tire available for use in case of accident, it is necessary simply to unscrew the short tube C, and pressing up the nozzle E by other means, as by collapsing the outer tire and pressing its interior against the inner end of the nozzle E, to unscrew and remove the nut G and apply the close-fitting cap H and turn it down hard to form a tight engagement. Now the tube C is again inserted and screwed down into tight contact with the offset $B^2$. Now the ordinary pump is connected to the tube C and its piston reciprocated. The air forced in carries downward the nozzle E, which is probably partly depressed by its gravity, and the pumping being continued the inner tire D is inflated, the air lying between it and the outer tire being expelled through the leak in the latter. Now the parts are in the position shown in Fig. 2, and after the air has been raised to a proper tension in the inner tire the pump is removed and the cap C² is applied and the machine is ready for use, serving in all respects as before. The inner tire may be far too fragile to endure rough usage. It is only required to retain the air; the outer tire remains as a defense. On returning home the bicyclist may cement or otherwise repair the accident to the outer tire, assuming it to be small, and may by a reversal of the treatment restore the parts to their original condition. That is to say he may remove the tube C, and by again pressing at the right point on the outer tire may bring the nozzle E again into the interior of the nozzle B, remove the cap H, restore the thin nut G, and again replace the tube C and again distend the tire, the outer tire receiving the pressure directly and the inner tire remaining out of use. The inner tire is preferably molded in such form that it tends naturally to assume the collapsed condition. The internal tire D of fine rubber is highly elastic, and we prefer to mold it of such size that it requires a little distension by the pneumatic force to make it match the interior of the outer tire. Such condition tends to reduce the chances of its ever wrinkling in use or ever bearing against the interior of the outer tire with force when it is out of use.

We claim as our invention—

1. In a double pneumatic tire, the small nozzle E on the inner tire adapted to match within the larger nozzle B on the outer tire, allowing the inner tire to be of no effect under ordinary conditions as herein specified.

2. In a pneumatic tire, the external tire A having a lip A′, the nozzle B having the external flange B′ and the internal offset B², the internal tire D and internal neck D′, in combination with each other and with the nozzle E secured to the neck D′ and screw-threaded on its exterior, adapted to engage either with the thin nut G to serve in one condition, or with the cap H to serve in another condition, all substantially as herein specified.

3. In a double pneumatic tire, the small nozzle E on the inner tire adapted to match within the larger nozzle B on the outer tire, allowing the internal tire to be of no effect, in combination with the cap H and means as screw-threads for applying and releasing it, adapted to change the conditions at will and allow the inner tire to be expanded and fill the space within the outer tire, substantially as herein specified.

4. In a double pneumatic tire, the small nozzle E on the inner tire adapted to match within the larger nozzle B on the outer tire, allowing the internal tire to be of no effect under ordinary conditions, in combination with the thin nut G adapted to hold the small nozzle reliably in the inert position and to be itself held by the removable tube C, as herein specified.

5. In a double pneumatic tire, the nozzle B, having internal screw-threads, performing the double function of a means for holding the nozzle for the internal tire and as a connection for the tube C for inflating either tire, all arranged for joint operation substantially as herein specified.

In testimony that we claim the invention above set forth we affix our signatures in presence of two witnesses.

RUDOLPH EUGENE TOLLNER.
CHARLES NEWTON POTTER.

Witnesses:
JOSEPH ELBERT,
EDWARD ELBERT.